(12) United States Patent
Shiotsu et al.

(10) Patent No.: US 11,959,766 B2
(45) Date of Patent: Apr. 16, 2024

(54) IN-VEHICLE APPARATUS, DISTRIBUTION SYSTEM, AND VIDEO RECEIVING METHOD

(71) Applicant: DENSO TEN Limited, Kobe (JP)

(72) Inventors: Shinichi Shiotsu, Kobe (JP); Tomoe Ohtsuki, Kobe (JP); Toshiyuki Moribayashi, Kobe (JP); Motoki Kojima, Kobe (JP); Hiroshi Yanagi, Kobe (JP)

(73) Assignee: DENSO TEN Limited, Kobe (JP)

( * ) Notice: Subject to any disclaimer, the term of this patent is extended or adjusted under 35 U.S.C. 154(b) by 186 days.

(21) Appl. No.: 17/018,115

(22) Filed: Sep. 11, 2020

(65) Prior Publication Data

US 2021/0102821 A1    Apr. 8, 2021

(30) Foreign Application Priority Data

Oct. 2, 2019   (JP) .................................. 2019-182390

(51) Int. Cl.
*G01C 21/36* (2006.01)
*G01C 21/34* (2006.01)

(52) U.S. Cl.
CPC ..... *G01C 21/3647* (2013.01); *G01C 21/3415* (2013.01)

(58) Field of Classification Search
CPC .......................... G01C 21/3647; G01C 21/3415
USPC ........................................................ 701/428
See application file for complete search history.

(56) References Cited

U.S. PATENT DOCUMENTS

| | | | | |
|---|---|---|---|---|
| 11,034,363 | B2* | 6/2021 | Choi | H04W 4/46 |
| 2007/0118281 | A1* | 5/2007 | Adam | G08G 1/096783 |
| | | | | 701/431 |
| 2009/0105933 | A1* | 4/2009 | Wlotzka | B60R 1/00 |
| | | | | 701/117 |
| 2018/0292225 | A1* | 10/2018 | West | G01C 21/3647 |

FOREIGN PATENT DOCUMENTS

| | | | |
|---|---|---|---|
| JP | H11-160090 A | 6/1999 | |
| JP | 2004139284 A | * 5/2004 | ......... G08G 1/09675 |
| JP | 2006-221537 A | 8/2006 | |

OTHER PUBLICATIONS

Hagino Takayuki, JP2004139284—Information Processor for Vehicle, 2004 (Year: 2004).*

* cited by examiner

*Primary Examiner* — Maceeh Anwari
(74) *Attorney, Agent, or Firm* — Oliff PLC

(57) ABSTRACT

An in-vehicle apparatus includes: a selection unit configured to select at least one candidate camera from plural cameras based on position information of each of the plural cameras; a reception unit configured to establish communication connection with the candidate camera selected by the selection unit and to start to receive video captured by the candidate camera; and a display control unit configured to display the video received by the reception unit in response to a predetermined display condition being satisfied.

16 Claims, 12 Drawing Sheets

FIG. 3

| POSITION INFORMATION |
| SENSOR INFORMATION |
| AREA INFORMATION |
| ROUTE INFORMATION |
| ... |

FIG. 4

| CAMERA ID | CAMERA TYPE | IP ADDRESS | CURRENT POSITION | VIDEO CAPTURING DIRECTION | CANDIDATE INFORMATION | ... |
|---|---|---|---|---|---|---|
| A0001 | FIXED POINT | A0001 | XX.YY | XX.YY | 1 | ... |
| A0003 | ON-VEHICLE CAMERA | A0003 | A0003 | A0003 | 0 | ... |
| A0025 | ON-VEHICLE CAMERA | A0025 | A0025 | A0025 | 1 | ... |
| ... | ... | ... | ... | ... | ... | ... |

IN-VEHICLE APPARATUS, DISTRIBUTION SYSTEM, AND VIDEO RECEIVING METHOD

CROSS-REFERENCE TO RELATED APPLICATIONS

This application is based upon and claims the benefit of priority from prior Japanese patent application No. 2019-182390, filed on Oct. 2, 2019, the entire contents of which are incorporated herein by reference.

BACKGROUND

Technical Field

The present invention relates to an in-vehicle apparatus, a distribution system, and a video receiving method.

Related Art

In a related art, for example, there is a distribution system that distributes a camera video captured by an in-vehicle apparatus such as a drive recorder mounted on a vehicle to another in-vehicle apparatus. In this distribution system, for example, a camera video that is captured from a vehicle approaching a traffic jam is published on a network (see, for example, JP-A-2006-221537).

SUMMARY

In the related art, there is room for improvement in displaying a camera video of another point quickly. Specifically, in the related art described above, since various types of processing executed by the in-vehicle apparatus on a reception side is started based on operation of a user who desires to view a camera video, delay time is generated until the camera video is actually displayed.

The present invention has been made in view of the above circumstances and an object of the present invention relates to providing an in-vehicle apparatus, a distribution system, and a video receiving method that are capable of displaying video of another point quickly.

According to an embodiment of the present invention, there is provided an in-vehicle apparatus including: a selection unit configured to select at least one candidate camera from plural cameras based on position information of each of the plural cameras; a reception unit configured to establish communication connection with the candidate camera selected by the selection unit and to start to receive video captured by the candidate camera; and a display control unit configured to display the video received by the reception unit in response to a predetermined display condition being satisfied.

According to the present invention, it may be possible to display a received video quickly.

BRIEF DESCRIPTION OF DRAWINGS

FIG. 3 shows a specific example of transmission list information.
FIG. 4 shows an example of camera position information.

DESCRIPTION OF EMBODIMENTS

Hereinafter, embodiments of an in-vehicle apparatus, a distribution system, and a video receiving method that are disclosed in the present application will be described in detail with reference to the accompanying drawings. The present invention is not limited by the following embodiment.

Figure 1A:
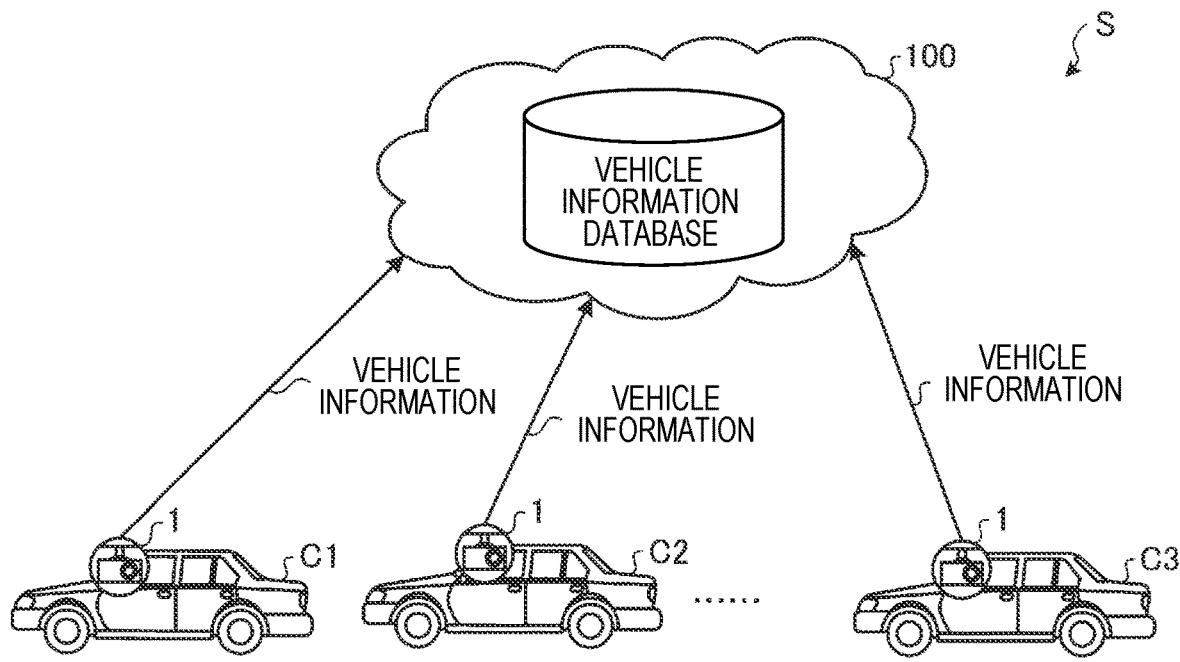
FIG. 1A shows an outline of a distribution system.
Figure 1B:
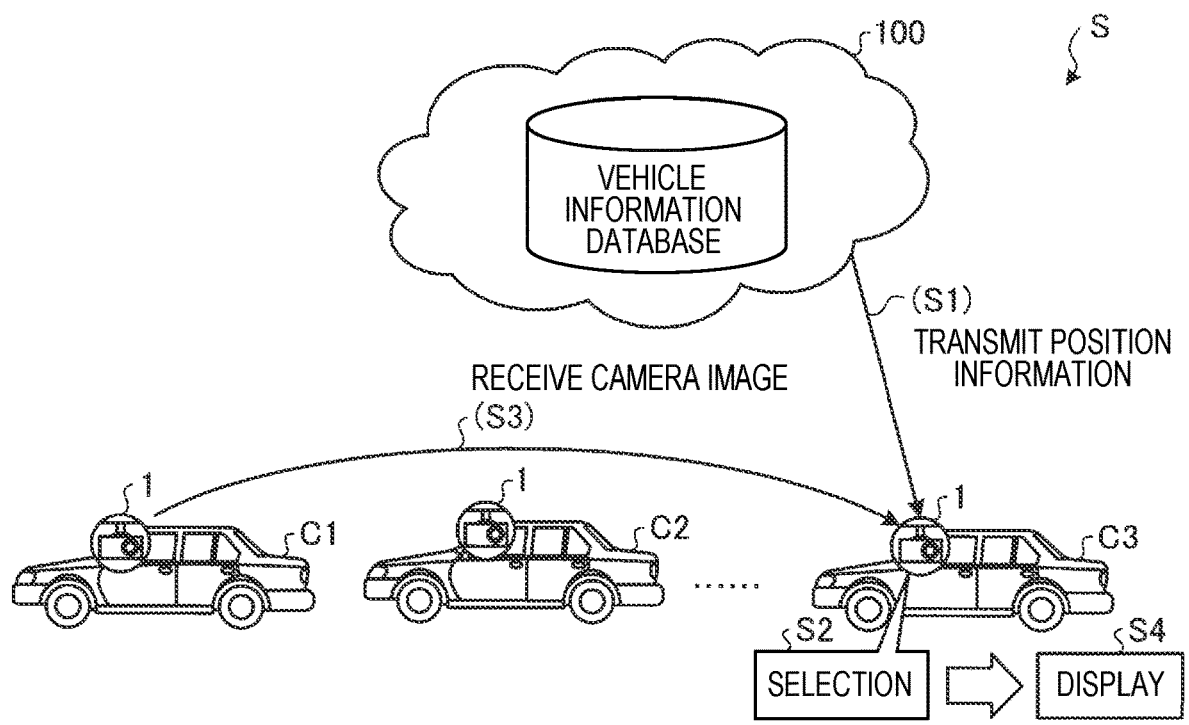
FIG. 1B shows an outline of a receiving method.

First, an outline of the distribution system and the video receiving method according to the embodiment will be described with reference to FIGS. 1A and 1B. FIG. 1A shows a configuration example of the distribution system. FIG. 1B shows the outline of the video receiving method. The video receiving method is executed by a management apparatus 100 and a plurality of in-vehicle apparatuses 1 that are shown in FIG. 1A transmitting and receiving data to and from each other.

As shown in FIG. 1A, a distribution system S according to the embodiment includes the in-vehicle apparatus 1 mounted on each vehicle and the management apparatus 100. The in-vehicle apparatus 1 is, for example, a drive recorder having a communication function. The in-vehicle apparatus 1 transmits vehicle information to the management apparatus 100 at a predetermined cycle. For example, the vehicle information includes a captured camera video, position information of a vehicle, information on a travel state, and the like.

The management apparatus 100 is a server apparatus configured to manage the vehicle information transmitted from each in-vehicle apparatus 1 in a vehicle information database.

In the distribution system S according to the embodiment, each in-vehicle apparatus 1 receives a camera video (including one frame of camera image) captured by another in-vehicle apparatus 1 and displays the received camera video, so that the distribution system S may provide a camera video of another point to an occupant in real time.

In recent years, with the spread of networks, an in-vehicle system in which an in-vehicle apparatus acquires a camera video captured by another in-vehicle apparatus and displays the camera video on a display in a vehicle has become widespread. However, in the related art, there is room for improvement in displaying a camera video of another point quickly.

Specifically, in the related art, user operation performed on an in-vehicle apparatus on a camera video reception side triggers selection of an in-vehicle apparatus on a camera video distribution side and communication connection between the in-vehicle apparatuses. Therefore, delay time is generated before a user views a distributed camera video.

Therefore, in the distribution system S according to the present embodiment, a candidate camera by whom a candidate camera video is captured is selected in advance, and communication connection between the in-vehicle apparatus 1 on a reception side that receives the camera video and the candidate camera is established in advance.

For example, in an example shown in FIG. 1B, a scene will be assumed in which a vehicle C3 is to enter a traffic jam. In this case, the management apparatus 100 grasps the traffic jam based on vehicle information transmitted from each in-vehicle apparatus 1, and predicts that the vehicle C3 is to enter the traffic jam.

Then, the management apparatus 100 transmits, to the in-vehicle apparatus 1 of the vehicle C3, position information of a traffic jam zone, position information of the in-vehicle apparatus 1 present in the traffic jam zone, and information on a network address and the like (step S1).

The in-vehicle apparatus 1 of the vehicle C3 selects a candidate camera as a candidate for distribution of a camera video based on the position information acquired from the management apparatus 100 (step S2). Here, the in-vehicle apparatus 1 of the vehicle C3 may select, for example, a camera (here, the in-vehicle apparatus 1 of a vehicle C1) capable of capturing an image of a beginning of the traffic jam when the vehicle C3 actually stops in the traffic jam zone, that is, may select a camera capable of capturing an image of a cause of the traffic jam as the candidate camera, or may select a camera capable of capturing an image of a point past the traffic jam as the candidate camera.

That is, in the processing in step S2, a camera capable of capturing an image of a point where an occupant of the vehicle C3 wants to check a current situation of the point is selected in advance as the candidate camera.

Then, the in-vehicle apparatus 1 of the vehicle C3 establishes communication connection with the selected candidate camera and starts to receive a camera video (step S3). As will be described in detail later, when starting to receive a camera video, the in-vehicle apparatus 1 of the vehicle C3 activates a viewer application for reproducing the received camera video and starts the reproduction in a background. At this time, the camera video reproduced in the background is not actually displayed.

After that, when a predetermined display condition is satisfied, the in-vehicle apparatus 1 of the vehicle C3 displays the received camera video (step S4). The display condition here indicates, for example, that predetermined user operation is received after preparation for displaying a camera video captured by the candidate camera has been completed.

More specifically, the in-vehicle apparatus 1 of the vehicle C3 displays a button for receiving user operation when the vehicle C3 stops after the preparation for displaying a camera video has been completed. When the displayed button is selected by an occupant, it is determined that the display condition is satisfied.

That is, in the video receiving method according to the embodiment, preprocessing for displaying a camera video has been completed, and a camera video is displayed when the display condition is satisfied.

As described above, in the video receiving method according to the embodiment, a scene is predicted in which an occupant of the vehicle C3 desires a camera video of another point, and reception and reproduction of the camera video are started in advance based on the prediction. In the video receiving method according to the embodiment, a camera video is displayed when the display condition is satisfied.

Therefore, according to the video receiving method in the embodiment, it is possible to display a camera video of another point quickly. Here, a case has been described as an example in which the vehicle C3 enters a traffic jam. However, the present invention is not limited thereto, and other examples will be described later. Hereinafter, a vehicle on a side of the in-vehicle apparatus 1 that receives a camera video will be referred to as a host vehicle, and the other vehicles may be referred to as other vehicles.

Figure 2:
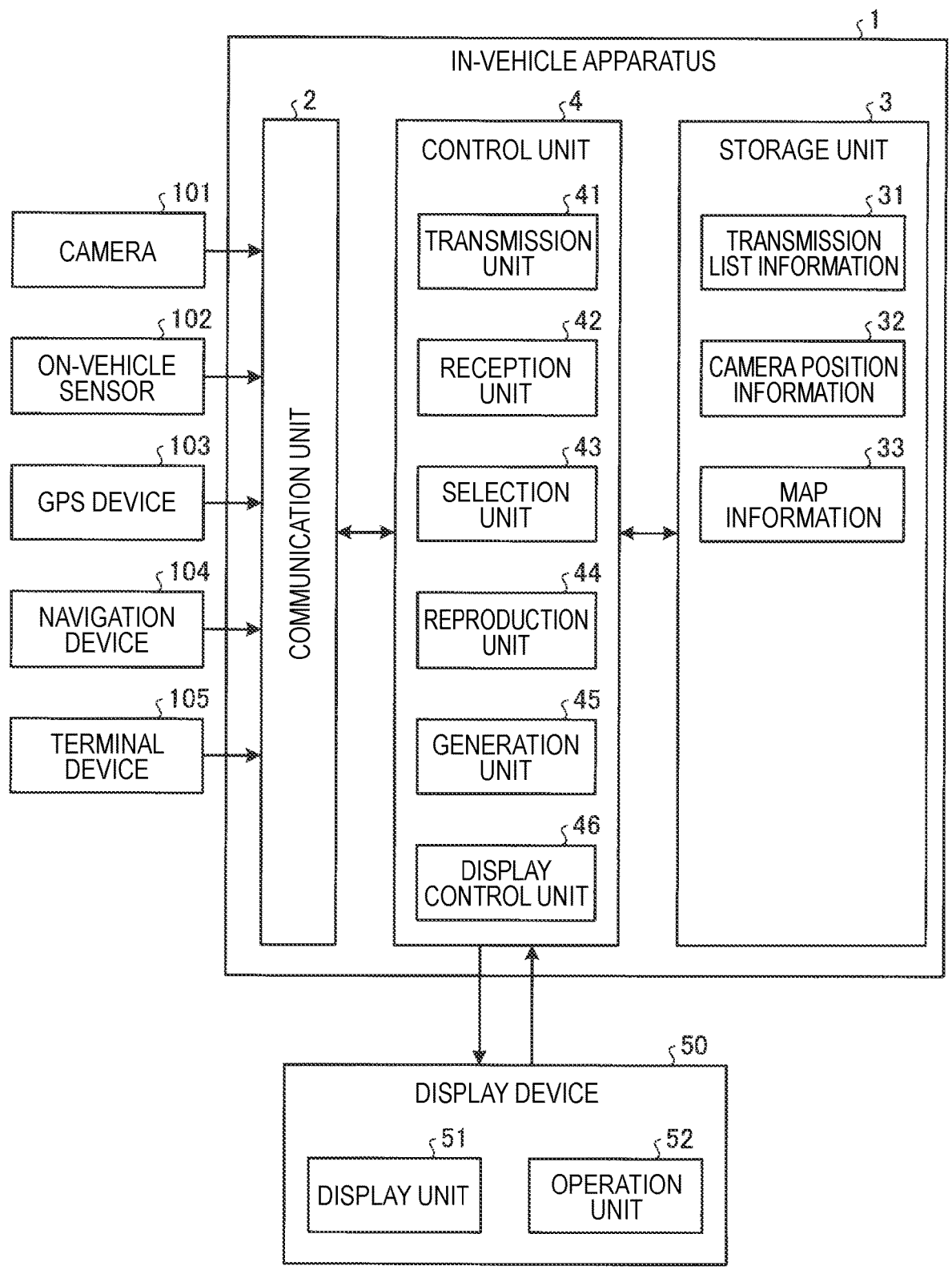
FIG. 2 is a block diagram of an in-vehicle apparatus.

Next, a configuration example of the in-vehicle apparatus 1 according to the embodiment will be described with reference to FIG. 2. FIG. 2 is a block diagram of the in-vehicle apparatus 1. As shown in FIG. 2, the in-vehicle apparatus 1 according to the embodiment is connected with a camera 101, an in-vehicle sensor 102, a global positioning system (GPS) device 103, a navigation device 104, and a terminal device 105.

The camera 101 is configured to capture a video of surrounds of a vehicle C and to generate a camera video at a predetermined frame rate. The in-vehicle sensor 102 is various sensors configured to detect a travel state of the vehicle C, and includes, for example, a speed sensor, a brake sensor, a steering angle sensor, a G sensor, and the like.

The GPS device 103 is configured to measure a current position of a vehicle based on a positioning signal transmitted from a GPS antenna (not shown). The navigation device 104 is configured to set a travel route to a destination of the vehicle C set by an occupant. The terminal device 105 is a portable communication device such as a smart phone or a tablet terminal owned by an occupant of the vehicle C.

As shown in FIG. 2, the in-vehicle apparatus 1 is connected to a display device 50 configured to display an image such as a camera video out put by the in-vehicle apparatus 1. The display device 50 includes a display unit 51 and an operation unit 52.

The display unit 51 is, for example, an organic EL or a touch panel display including a liquid crystal display, and is configured to display a video signal out put from the in-vehicle apparatus 1. The operation unit 52 is configured to receive predetermined operation from an occupant based on an image displayed on the display unit 51.

The operation unit 52 may also receive various types of operation such as reproduction, stop, and rewind of a camera video. A user may also request distribution of a camera video captured in the past via the operation unit 52.

That is, in the distribution system S according to the embodiment, in addition to real-time distribution of a camera video, it is also possible to perform recording distribution of a camera video captured in the past. The operation unit 52 may be provided separately from the display device 50, for example.

As shown in FIG. 2, the in-vehicle apparatus 1 includes a communication unit 2, a storage unit 3, and a control unit 4. The communication unit 2 is implemented by, for example, an NIC. The communication unit 2 is wirelessly connected to a predetermined network, and is configured to transmit and receive information to and from various cameras such as another in-vehicle apparatus 1 and the management apparatus 100 via a network.

The storage unit 3 is implemented by a semiconductor memory element such as a RAM or a flash memory, or a storage device such as a hard disk or an optical disk, and is configured to store, in an example in FIG. 2, transmission list information 31, camera position information 32, and map information 33.

The transmission list information 31 is information on a list of data when each in-vehicle apparatus 1 transmits vehicle information to the management apparatus 100. FIG. 3 shows a specific example of the transmission list information 31. As shown in FIG. 3, the transmission list information 31 includes position information, sensor information, area information, route information, and the like.

The position information is information on a current position of a vehicle, and is notified from the GPS device 103 to the in-vehicle apparatus 1. The sensor information is information on various sensor values detected by the in-vehicle sensor 102.

The area information is information on an area displayed in a navigation image of the navigation device 104. For example, the area information is notified to the management apparatus 100 each time a navigation image is updated.

The route information is information on a destination set in the navigation device 104 and a planned travel route to the destination. The transmission list information 31 shown in FIG. 3 is an example, and may be changed freely.

Referring back to FIG. 2, the camera position information 32 will be described. The camera position information 32 is information on each camera. FIG. 4 shows an example of the camera position information 32. As shown in FIG. 4, the camera position information 32 is information in which a camera ID, a camera type, an IP address, a current position, an video capturing direction, candidate information, and the like are associated with one another.

The camera ID indicates an identifier for identifying each camera registered in the distribution system S. The camera type indicates a type of a corresponding camera. In an example in FIG. 4, either a fixed-point camera or an on-vehicle camera is assigned as the camera type. The fixed-point camera indicates, for example, a camera provided on a road or the like, and the on-vehicle camera indicates a camera mounted on each vehicle.

The IP address indicates an address on a network assigned to a corresponding camera. The current position indicates a current position of a corresponding camera, and the video capturing direction indicates a video capturing direction of a corresponding camera.

The current position and the video capturing direction of the fixed-point camera basically do not change, whereas the current position and the video capturing direction of the on-vehicle camera are updated at a predetermined cycle as a vehicle moves. At this time, the video capturing direction can be estimated based on, for example, a travel direction of a vehicle.

The candidate information indicates whether a corresponding camera is selected as a candidate camera. For example, "1" is assigned when a corresponding camera is selected as a candidate camera and "0" is assigned when a corresponding camera is not selected as a candidate camera.

Referring back to FIG. 2, the map information 33 will be described. The map information 33 is information on a map including a road type of each road and the like. The map information 33 includes information on various facilities which are a convenience store, a restaurant, a tourist attraction, and the like.

The map information 33 may include, for example, information which is a traffic jam point, an accident frequent occurrence point, a sudden braking frequent occurrence point, and the like. This information may be obtained, for example, from the management apparatus 100.

Next, the control unit 4 will be described. The control unit 4 includes, for example, a computer including a central processing unit (CPU), a read only memory (ROM), a random access memory (RAM), a hard disk drive (HDD), an input and out put port, and the like, and various circuits.

The CPU of the computer functions as a transmission unit 41, a reception unit 42, a selection unit 43, a reproduction unit 44, a generation unit 45, and a display control unit 46 of the control unit 4 by reading and executing a program stored in the ROM, for example.

At least a part or all of the transmission unit 41, the reception unit 42, the selection unit 43, the reproduction unit 44, the generation unit 45, and the display control unit 46 of the control unit 4 may be implemented by hardware which is an application specific integrated circuit (ASIC), a field programmable gate array (FPGA), or the like.

The transmission unit 41 is configured to transmit vehicle information on the vehicle C to the management apparatus 100 at a predetermined cycle. Specifically, the transmission unit 41 generates vehicle information based on the transmission list information 31 stored in the storage unit 30, and transmits the vehicle information to the management apparatus 100.

At this time, the transmission unit 41 does not need to generate vehicle information including all of the information described in the transmission list information 31, and may select data to generate transmission data. For example, the transmission unit 41 may transmit sensor information and image information only when sudden braking or a steep steering angle has been detected. When a host device has been selected as a candidate camera, the transmission unit 41 transmits a camera video.

The reception unit 42 establishes communication connection with a candidate camera selected by the selection unit 43, and starts to receive a camera video captured by the candidate camera. First, the reception unit 42 receives position information of each candidate camera present in a predetermined area from the management apparatus 100, and updates the camera position information 32 in the storage unit 3 based on the received position information.

Here, the predetermined area is, for example, an area included in a navigation image generated by the navigation device 104 or an area within a predetermined range from a current position of a host vehicle. Alternatively, the predetermined area may be on a route to a destination set in the navigation device 104.

When the selection unit 43 (described later) has selected a candidate camera, the reception unit 42 instructs the transmission unit 41 to issue a connection request for communication connection to the selected candidate camera. Thereafter, when the communication connection with the candidate camera is established, the reception unit 42 starts to receive a camera video captured by the candidate camera. The reception unit 42 receives position information and a video capturing direction (a travel direction) of the candidate camera together with a camera video, and updates the camera position information 32 each time the reception unit 42 receives position information of the candidate camera.

The reception unit 42 is configured to receive a camera video from an on-vehicle camera or a fixed-point camera selected as a candidate camera. Accordingly, it is possible to receive a camera video obtained by capturing a video of another point from various angles. For example, when videos of the same point are captured by the on-vehicle camera and the fixed-point camera, the camera videos having different angles of view are captured.

When starting to receive a camera video, the reception unit 42 activates a viewer application (corresponding to the reproduction unit 44 described later) for reproducing a camera video. Then, the reproduction unit 44 starts background reproduction.

Since a camera video to be reproduced at a time of background reproduction is not basically displayed on the display device 50, the reception unit 42 may receive a low-capacity image of the camera video at the time of background reproduction.

The low-capacity image is a camera video including any one of a camera video having a lower frame rate, a camera video having a lower resolution, and a camera video having a lower bit rate, as compared with a camera video actually displayed on the display device 50. Accordingly, it is possible to receive a camera video while reducing a communication load.

The selection unit 43 is configured to select a candidate camera from a plurality of cameras based on position information indicating a position of each of the plurality of cameras, and to update candidate information of the camera position information 32. When a trigger linked to a display condition has been detected, the selection unit 43 starts processing of selecting the candidate camera.

In other words, when the trigger linked to the display condition has been detected, the in-vehicle apparatus 1 starts a series of processing until a camera video is displayed, and starts to display the camera video when the display condition is satisfied.

The selection unit 43 detects a predetermined event that occurs before the display condition is satisfied as the above-described trigger. The selection unit 43 predicts a scene in which an occupant desires a camera video of another point based on the above-described detected trigger. Accordingly, it is possible to promptly display a camera video of another point when an occupant desires the camera video (when the display condition is satisfied).

In the present embodiment, the trigger linked to the display condition includes entry (hereinafter referred to as a first trigger) of a host vehicle into a traffic jam zone and a destination setting (hereinafter referred to as a second trigger) for the navigation device 104. Hereinafter, the above-described first trigger and the above-described second trigger will be described as examples.

The selection unit 43 may detect the first trigger based on traffic jam information transmitted from the management apparatus 100 and may detect the second trigger based on a setting signal based on a destination setting notified from the navigation device 104.

Figure 5:
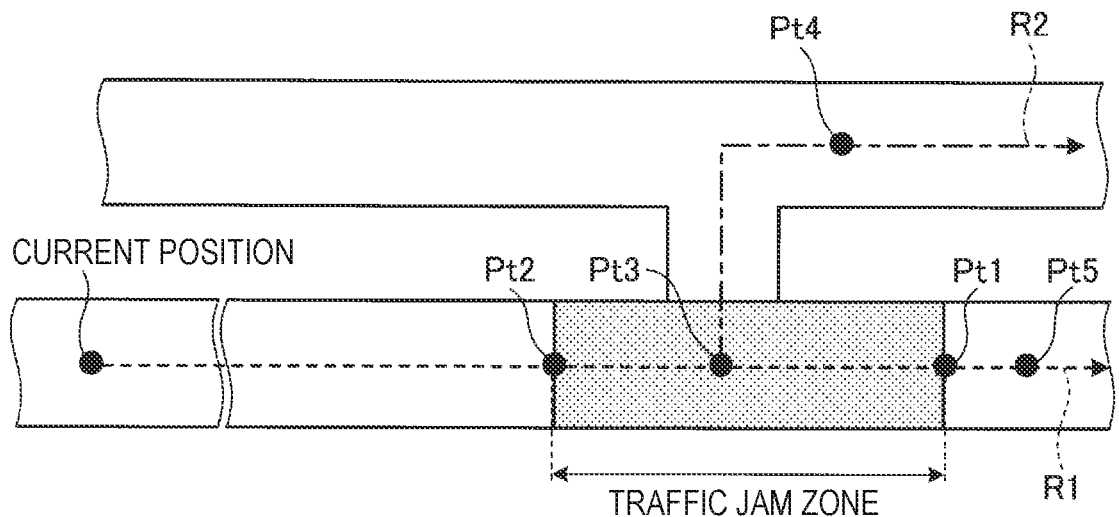
FIG. 5 is a diagram (part 1) showing a specific example of candidate camera selection.
Figure 6:
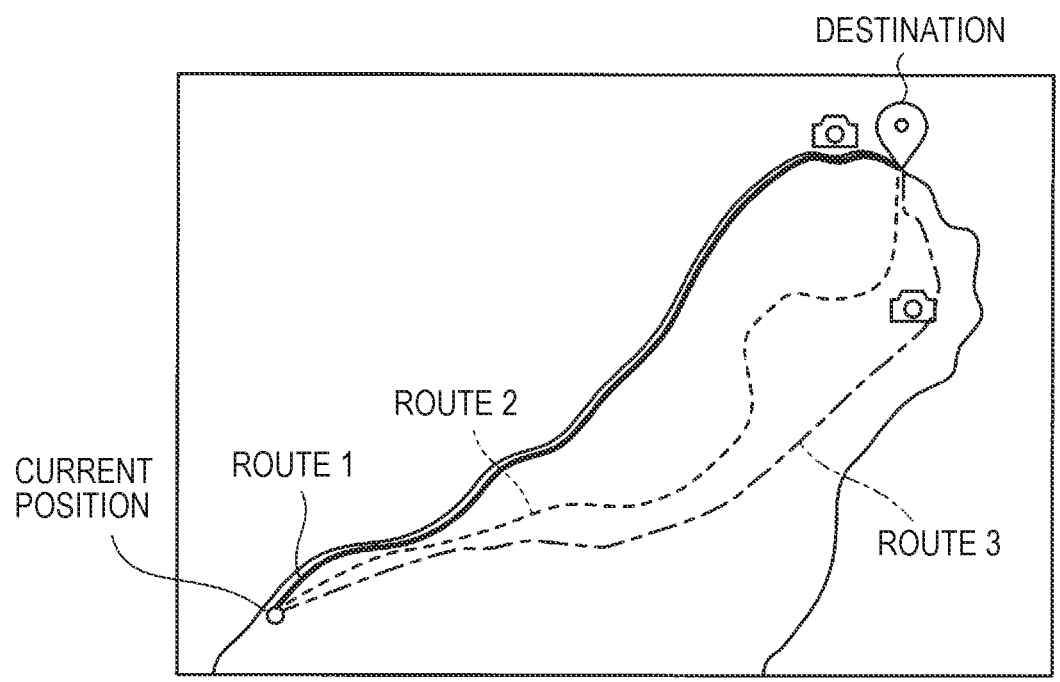
FIG. 6 is a diagram (part 2) showing the specific example of candidate camera selection.

Next, a specific example of the processing of selecting the candidate camera will be described. FIGS. 5 and 6 shows a specific example of candidate camera selection. First, a case in which the candidate vehicle is selected based on the above-described first trigger will be described with reference to FIG. 5.

An example shown in FIG. 5 shows a scene in which a vehicle passes through a traffic jam zone when traveling from a current position along a planned travel route R1. In this case, first, the selection unit 43 sets a point of interest Pt.

Here, the point of interest Pt is a point where it is expected that an occupant of a host vehicle desires to grasp a current situation. The example shown in FIG. 5 shows a scene in which points of interest Pt1, Pt2 are set at a beginning and a rear end of the traffic jam zone, a point of interest Pt3 is set at a branch point between the planned travel route R1 and a detour R2 for the planned travel route R1, and a point of interest Pt4 is set on the detour R2. The example shown in FIG. 5 further shows a scene in which a point of interest Pt5 is set at a point beyond the traffic jam zone.

The selection unit 43 may acquire information on the planned travel route R1 and the detour R2 from the navigation device 104, and may acquire information on the traffic jam zone from the management apparatus 100.

Then, when the point of interest Pt is set, the selection unit 43 refers to the camera position information 32, and selects, as the candidate camera, an on-vehicle camera mounted on another vehicle that is scheduled to pass through the set point of interest Pt or a fixed-point camera capable of capturing a video of the point of interest Pt based on position information of each camera.

As described above, the selection unit 43 starts the processing of selecting the candidate camera with a fact that a host vehicle is predicted to enter the traffic jam zone as a trigger, so that it is possible to promptly display a camera video of another point when the host vehicle actually encounters a traffic jam.

The selection unit 43 selects cameras located in the traffic jam zone and beyond the traffic jam zone as the candidate cameras, so that it is possible for an occupant to easily recognize a current state of the traffic beyond the traffic jam zone in addition to a current state of the traffic in the traffic jam zone.

The selection unit 43 selects a camera that is present in the detour R2 as the candidate camera, so that it is possible for an occupant to recognize a current state of the traffic of the detour R2 in addition to the traffic jam zone. In particular, it is possible to easily determine whether an occupant is to drive the planned travel route R1 without changing or to change a route to the detour R2.

At this time, the selection unit 43 may set, for example, a break point (for example, a service area) as the point of interest Pt, and may select another vehicle that is present at the break point as the candidate camera. The selection unit 43 may set the points of interest Pt at a predetermined interval, or may set the points of interest Pt at a singular point which is a curve, a bridge, a tunnel, or the like.

The selection unit 43 selects a plurality of candidate cameras for each of the points of interest Pt. This is because, when a camera video actually captured by the candidate camera is displayed, the candidate camera may have already passed the point of interest Pt.

On the other hand, if a plurality of candidate cameras are selected, it is possible for the plurality of candidate cameras to sequentially capture a video of the point of interest Pt. In other words, a plurality of candidate cameras are selected in advance, so that it is possible to capture a video of the point of interest Pt for a longer period than in a case in which one candidate camera is selected.

Here, a case has been described in which the selection unit 43 selects the candidate camera after the point of interest Pt has been set. However, the present invention is not limited thereto. That is, the candidate camera that passes through the traffic jam zone or the detour R2 may be selected. Alternatively, each of the traffic jam zone and the detour R2 may be divided into a plurality of sections, and a predetermined number of candidate cameras may be selected for each of the divided sections.

Next, processing of the selection unit 43 based on the second trigger will be described with reference to FIG. 6. FIG. 6 shows a scene in which a destination is set in the navigation device 104 by user operation, and routes 1 to 3, which are candidate routes to the destination, are displayed on the display unit 51.

In this case, the selection unit 43 compares position information of each camera with position information of each of the routes 1 to 3, and selects a camera that is present on the routes 1 to 3 as the candidate camera.

At this time, the selection unit 43 may set the point of interest Pt on each of the routes 1 to 3, and may set a camera capable of capturing a video of the point of interest Pt as the candidate camera.

The selection unit 43 may set the point of interest Pt based on, for example, a recommended spot such as a superb view spot that is present on each of the routes 1 to 3 and travel information of another vehicle. For example, when the recommended spot is set as the point of interest Pt, the selection unit 43 may extract the recommended spot based on event information and a hobby and a preference of an occupant.

Event information and information on a hobby and a preference may be analyzed, for example, from a tendency of a destination in a host vehicle, a conversation content in the host vehicle, a web search history in the terminal device 105, and the like.

When the point of interest Pt is set based on travel information of another vehicle, the selection unit 43 may set a traffic jam point, a sudden braking frequent occurrence point, or the like as the point of interest Pt. In addition, the selection unit 43 may set the point of interest Pt based on weather information. For example, when any one of the routes 1 to 3 includes a local heavy rain zone, this heavy rain zone may be set as the point of interest Pt.

When the candidate camera (another vehicle) is selected after the point of interest Pt has been set, it is assumed that the other vehicle selected as the candidate camera deviates from a route on which a vehicle travels through the point of interest Pt.

Therefore, when selecting another vehicle as the candidate camera, the selection unit 43 may monitor position information of the other vehicle, may cancel the selection of the candidate camera of the other vehicle when the other vehicle deviates from the point of interest Pt, and may execute the processing of selecting another candidate camera again.

The selection unit 43 may select the candidate camera after estimating a scheduled passage time of each of the points of interest Pt based on a current travel speed of another vehicle and the like. Specifically, the selection unit 43 may predict a time when a display condition of a camera video is satisfied, and may select the candidate camera such that the time when a display condition of a camera video is satisfied substantially matches the scheduled passage time of the other vehicle.

The selection unit 43 may acquire, for example, information on a planned travel route of another vehicle, and may exclude, in advance, the other vehicle scheduled to deviate from a candidate route from selection targets of the candidate camera. The information on the planned travel route of the other vehicle may be acquired from the management apparatus 100 or the in-vehicle apparatus 1 of the other vehicle.

Referring back to FIG. 2, the reproduction unit 44 will be described. The reproduction unit 44 is a so-called viewer application, and is configured to reproduce a camera video received by the reception unit 42. Here, since the in-vehicle apparatus 1 may be connected to a plurality of candidate cameras at the same time, it is preferable that the reproduction unit 44 has a simultaneous reproduction function of reproducing a plurality of camera videos at the same time or includes a plurality of viewer applications.

The reproduction unit 44 notifies the display control unit 46 of a standby signal for each candidate camera when a camera video of the candidate camera may be reproduced normally, that is, when preparation for displaying a camera video has been completed.

Figure 7:
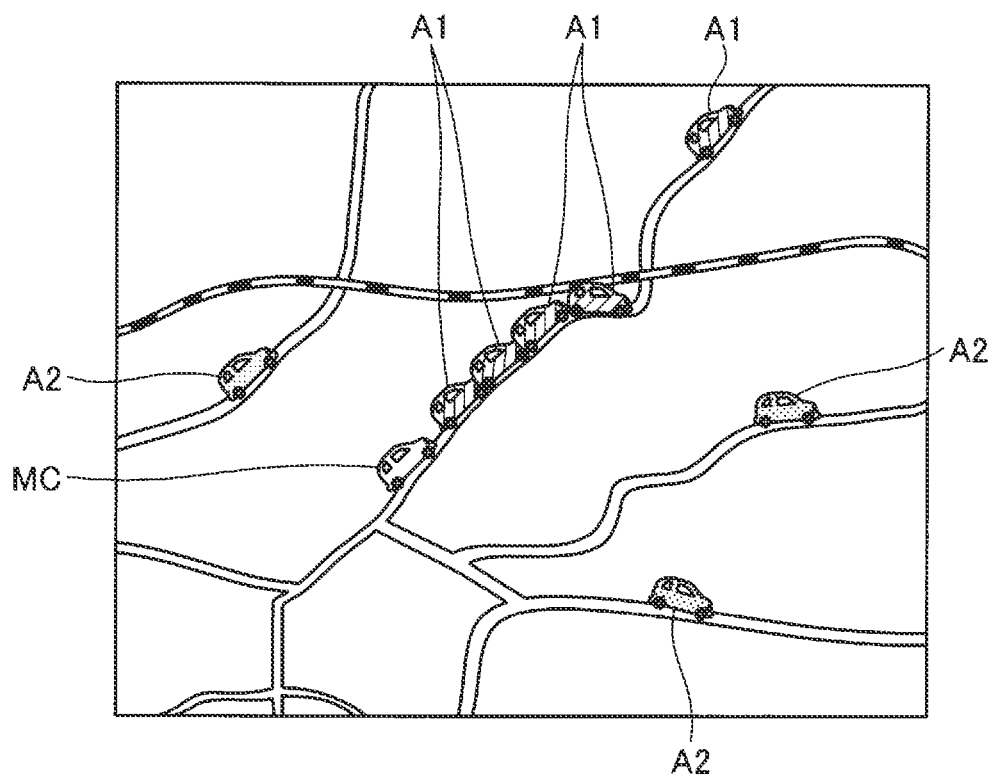
FIG. 7 shows an example of a displayed image.

The generation unit 45 is configured to generate a displayed image to be displayed on the display device 50 by processing a navigation image notified from the navigation device 104. FIG. 7 shows an example of the displayed image. FIG. 7 shows a case in which each camera is an on-vehicle camera.

As shown in FIG. 7, the generation unit 45 generates a displayed image by superimposing icons A1, A2 indicating positions of cameras that are present on a navigation image with reference to the camera position information 32.

Directions of the icons A1, A2 shown in FIG. 7 indicate travel directions of corresponding vehicles. The icon A1 indicates a camera in which preparation for displaying a camera video captured by the corresponding camera has been completed. That is, in the example in FIG. 7, the candidate camera in which communication connection has been established is indicated by the icon A1, and the other cameras are indicated by the icon A2.

The generation unit 45 switches an icon of a corresponding camera from the icon A2 to the icon A1 each time a standby signal is acquired from the reproduction unit 44, and switches the icon of a corresponding camera from the icon A1 to the icon A2 when communication connection has been interrupted or terminated.

When a camera type is an on-vehicle camera, the generation unit 45 moves positions of the icons A1, A2 in the navigation image as the on-vehicle cameras move. The generation unit 45 may display only the candidate cameras with which communication connection has been established on the navigation image. That is, an icon of a camera that is not selected as the candidate camera or an icon of a camera that has been selected as the candidate camera but with which communication connection is not established may not be displayed.

For example, when the icon A2 indicating a camera with which communication connection is not established is selected by an occupant, the in-vehicle apparatus 1 may start communication connection with the camera corresponding to the icon A2 and may start to receive a camera video.

In this case, it is also possible to switch an icon of a corresponding camera from the icon A2 to the icon A1 and to display a camera video of the corresponding camera when the icon A1 has been selected.

Referring back to FIG. 2, the display control unit 46 will be described. The display control unit 46 is configured to display a camera video received by the reception unit 42 when a predetermined display condition is satisfied. Here, the display condition indicates that predetermined user operation is received after preparation for displaying a camera video received from the candidate camera has been completed.

First, a case will be described in which a host vehicle enters a traffic jam zone. The display control unit 46 receives completion of the preparation for displaying each candidate camera from the reproduction unit and determines whether a host vehicle has stopped based on a signal input from the in-vehicle sensor 102.

When the display control unit 46 determines that the host vehicle has stopped, the display control unit 46 displays an operation button. Here, displaying the operation button includes not only simply displaying the operation button but also switching the displayed operation button to an active state (a selectable state).

Then, when the operation button is selected by an occupant, a camera video being reproduced by the reproduction unit 44 is displayed. Here, displaying a camera video indicates switching a screen layer of the camera video being reproduced in a background by the reproduction unit 44 to a foreground. That is, when a display condition is satisfied, it is possible to display a camera video only by switching the screen layer.

Figure 8A:
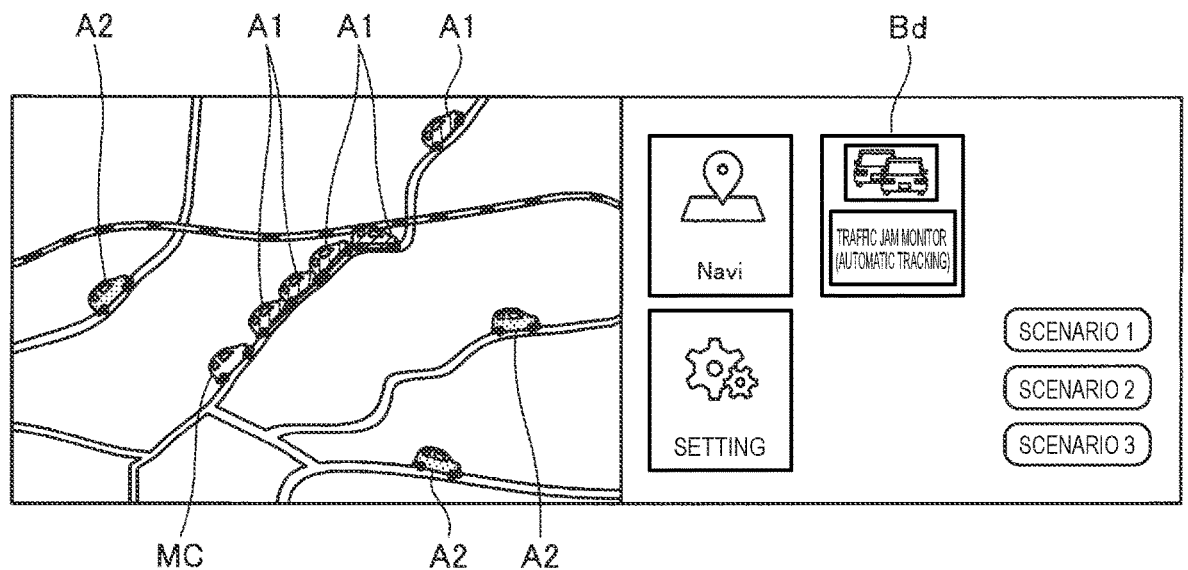
FIG. 8A is a diagram (part 1) showing an example of processing executed by a display control unit.
Figure 8B:
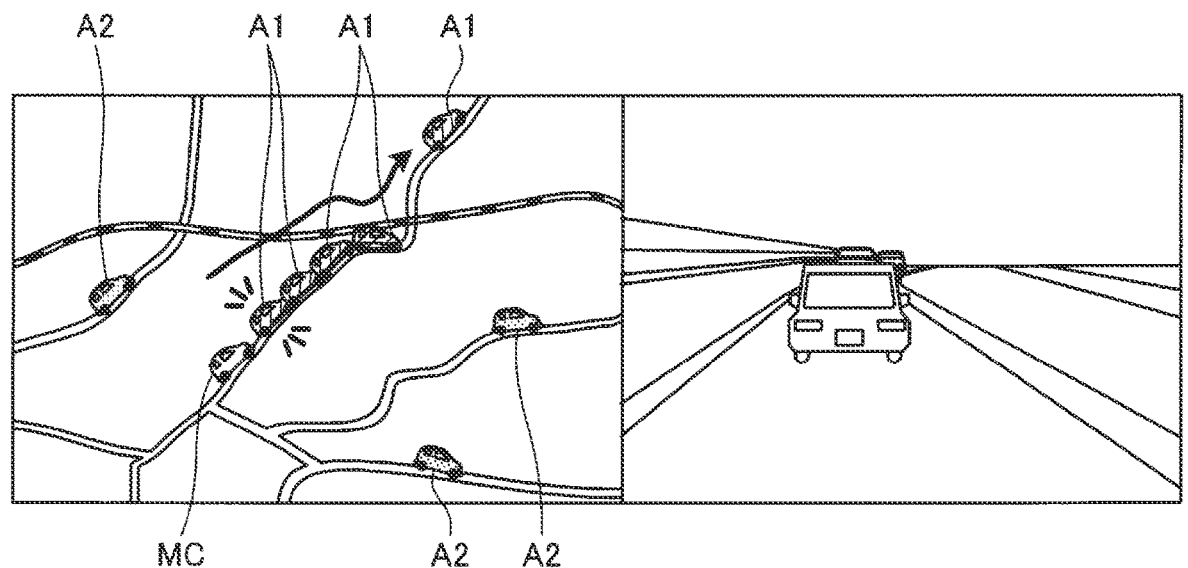
FIG. 8B is a diagram (part 2) showing an example of processing executed by the display control unit.

Accordingly, it is possible to quickly display a received camera video of another point. In order to make a description easy to understand, a series of processing up to this point will be described with reference to FIGS. 8A and 8B. FIGS. 8A and 8B show an example of processing executed by the display control unit 46.

As shown in FIG. 8A, the display control unit 46 displays an operation button Bd, for example, when a host vehicle stops after all preprocessing for the candidate camera has been completed. That is, by displaying the operation button Bd, the occupant is notified that the preparation for displaying a camera video has been completed.

Then, when the operation button Bd is selected by an occupant, the display control unit 46 displays a camera video. Specifically, for example, camera videos are displayed while the candidate cameras are sequentially switched along an arrow shown in FIG. 8B. In an example shown in FIG. 8B, camera videos of the corresponding candidate cameras are displayed while being switched in order of nearness from a host vehicle by a predetermined period of time.

Accordingly, an occupant may grasp a current state of a plurality of other points sequentially. At this time, for example, the display control unit 46 may blink the icon A1 of the candidate camera currently displaying a camera video to notify an occupant of a position (a video capturing point of the camera video) of the candidate camera.

Accordingly, an occupant may easily grasp a video capturing position of a camera video. A distance to the video capturing point of the camera video being displayed may also be displayed together. For example, when an occupant has selected the icon A1, the display control unit 46 may display a camera video captured by the candidate camera corresponding to the icon A1.

The display control unit 46 may also display a camera video that is a video of the point of interest Pt being captured when the display condition is satisfied. For example, whether each camera video is a video of the point of interest Pt being captured may be determined based on, for example, a positional relationship between a current position and a video capturing direction of each candidate camera and the point of interest Pt.

That is, the display control unit 46 may display a current state of another point of high importance to an occupant by preferentially displaying the point of interest Pt, so that it is possible to improve convenience.

A period of displaying a camera video captured by one candidate camera may be set to, for example, a fixed value, or may be adjusted according to the number of the candidate cameras that display a camera video.

For example, when the number of the candidate cameras that display a camera video is large, display time of each candidate camera may be shortened, and when the number of the candidate cameras is small, the display time of each candidate camera may be lengthened.

The display control unit 46 does not need to display camera videos of all the candidate cameras, and may select a candidate camera that displays a camera video from among a plurality of the candidate cameras. For example, the display control unit 46 may display, based on position information of each candidate camera, a camera video of the candidate camera that is most suitable for capturing a video of the point of interest Pt.

Next, a case will be described in which a destination is set by the navigation device 104. In this case, the display control unit 46 waits for completion of preprocessing of a camera video captured by each candidate camera, displays an operation button, and displays a camera video when an occupant has selected the operation button.

Figure 9A:
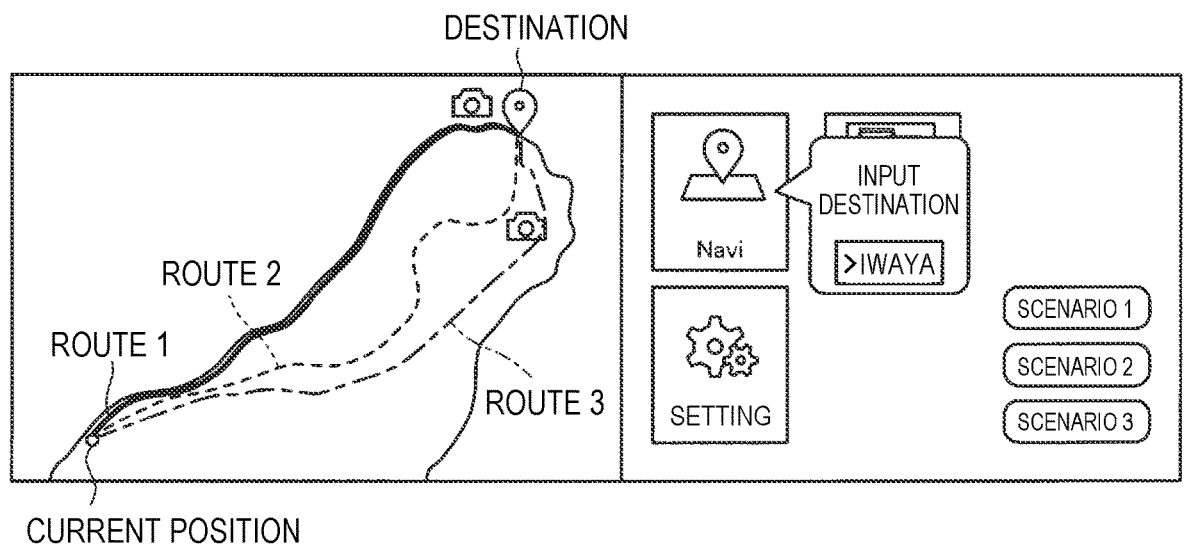
FIG. 9A is a diagram (part 3) showing an example of processing executed by the display control unit.
Figure 9B:
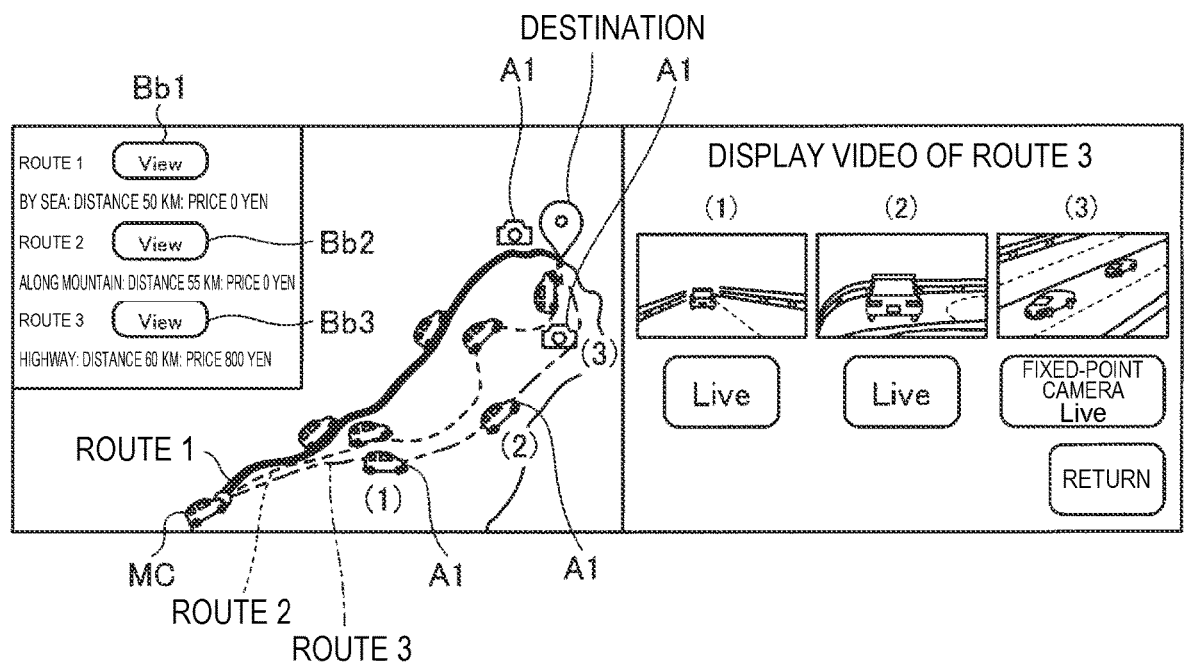
FIG. 9B is a diagram (part 4) showing an example of processing executed by the display control unit.

FIGS. 9A and 9B show an example of processing executed by the display control unit 46. As shown in FIG. 9A, when an occupant sets a destination, for example, the in-vehicle apparatus 1 acquires information on a candidate route from the navigation device 104 to the destination, starts processing of selecting the candidate camera by the selection unit 43, and executes a series of preprocessing for a camera video.

Then, when the above-described preprocessing is completed, the display control unit 46 displays operation buttons Bb1 to Bb3 as shown in FIG. 9B. An example shown in FIG. 9B shows a case in which three candidate routes are present, and a case in which each of the operation buttons Bb1 to Bb3 is displayed for a corresponding one of the candidate routes.

Then, the display control unit 46 displays a camera video corresponding to the operation button Bb selected by an occupant. An example shown in FIG. 9B shows a case in which the operation button Bb3 corresponding to the route 3 is selected from among the plurality of candidate routes, and a case in which camera videos of points (1) to (3) on the route 3 are displayed in a list.

Accordingly, an occupant may previously check a current situation on the route 3, scenery that is visible from the route 3, and the like. When an occupant has selected the operation buttons Bb1, Bb2, a camera video on the route (1) or (2) corresponding to a respective one of the operation buttons Bb1, Bb2 is displayed.

Therefore, even if an occupant does not search each candidate route to a destination, it is possible to easily compare the candidate routes and to easily determine an actually travel route.

Camera videos of a plurality of points are displayed in a list, so that it is possible for an occupant to easily grasp current states of the plurality of points that are present on the selected candidate route.

In this way, a current state of each candidate route is provided to an occupant, so that it is possible for the occupant to easily select a candidate route. A current state of a sudden braking frequent occurrence point or the like is displayed, so that it is also possible to urge an occupant to be alerted when a host vehicle travels through the sudden braking frequent occurrence point. The sudden braking frequent occurrence point is the point of interest Pt that is set based on travel information of another vehicle.

In the example shown in FIG. 9B, a case has been described in which camera videos on one candidate route are displayed in a list. However, the present invention is not limited thereto. That is, camera videos on the plurality of candidate routes may be arranged and displayed in a list.

Figure 10:
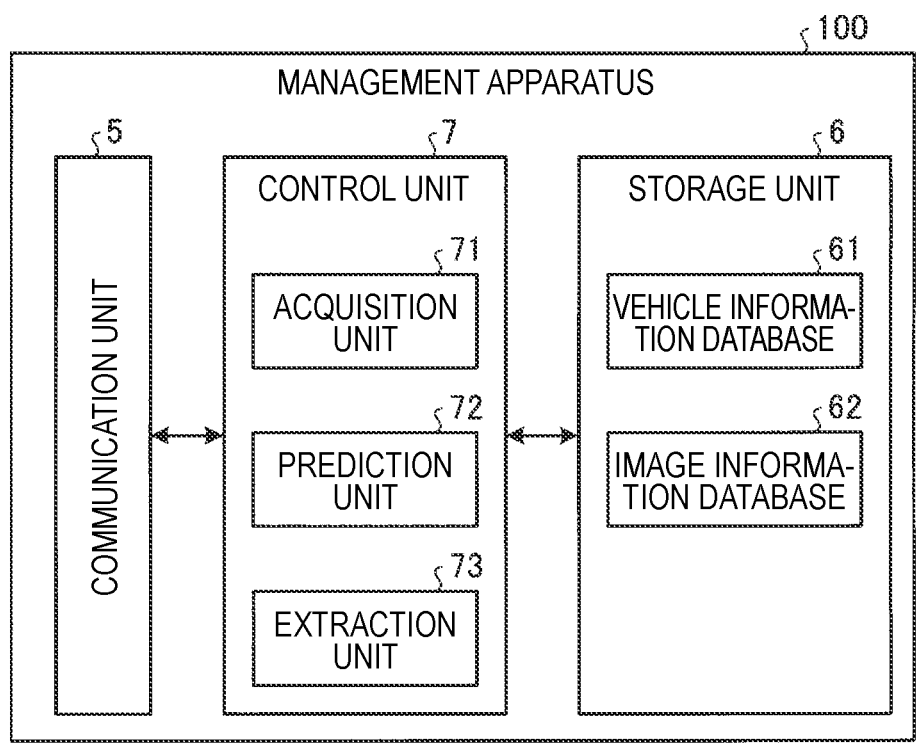
FIG. 10 is a block diagram of a management apparatus.

Next, a configuration example of the management apparatus 100 according to the embodiment will be described with reference to FIG. 10. FIG. 10 is a block diagram of the management apparatus 100. As shown in FIG. 10, the management apparatus 100 includes a communication unit 5, a storage unit 6, and a control unit 7.

Similar to the communication unit 2, the communication unit 5 is implemented by, for example, an NIC. The communication unit 5 is wirelessly connected to a predetermined network, and is configured to transmit and receive information to and from another in-vehicle apparatus 1 and various cameras via a network.

The storage unit 6 is implemented by a semiconductor memory element such as a RAM or a flash memory, or a storage device such as a hard disk or an optical disk, and includes, in an example in FIG. 10, a vehicle information database 61 and an image information database 62.

The vehicle information database 61 is configured to store vehicle information transmitted from each in-vehicle apparatus 1. In the vehicle information database 61, for example, a current position, a destination, a travel direction, a current travel speed, a history of sudden steering and sudden braking, and the like of each vehicle are appropriately registered. In the vehicle information database 61, information on position information of a fixed-point camera and the like is also registered.

The image information database 62 is configured to store camera videos transmitted from each camera. For example, in the image information database 62, a camera ID of a camera that captures a video, a video capturing date and time, a video capturing position, a video capturing direction, and the like are stored in association with a camera video.

Next, the control unit 7 will be described. The control unit 7 includes, for example, a computer including a central processing unit (CPU), a read only memory (ROM), a random access memory (RAM), a hard disk drive (HDD), an input and out put port, and the like, and various circuits.

The CPU of the computer functions as an acquisition unit 71, a prediction unit 72, and an extraction unit 73 of the control unit 7 by reading and executing a program stored in the ROM, for example.

At least a part or all of the acquisition unit 71, the prediction unit 72, and the extraction unit 73 of the control unit 7 may be implemented by hardware which is an application specific integrated circuit (ASIC), a field programmable gate array (FPGA), or the like.

The acquisition unit 71 is configured to acquire vehicle information from each in-vehicle apparatus 1 and to update the vehicle information database 61 based on the acquired vehicle information. The acquisition unit 71 may also acquire a camera video and may update the image information database 62.

The acquisition unit 71 acquires a search request transmitted from each in-vehicle apparatus 1. Here, the search request includes information for specifying a camera search range. In particular, in the present embodiment, the search request includes information on a candidate route set in the navigation device 104 of each vehicle and information on a navigation display range. When acquiring the search request, the acquisition unit 71 notifies the extraction unit 73 of information on the search range.

The prediction unit 72 predicts whether there is a traffic jam and a traffic jam zone based on the vehicle information transmitted from each in-vehicle apparatus 1. For example, the prediction unit 72 monitors a current position of each vehicle, a travel speed, and the like at any time, predicts whether there is a traffic jam based on a congestion level of each road, and predicts a traffic jam zone based on a travel situation of each vehicle on each road.

Then, the prediction unit 72 refers to the vehicle information database 61, and predicts a vehicle that is to enter the traffic jam zone based on whether there is a traffic jam and the traffic jam zone that have been estimated. For example, the prediction unit 72 predicts a vehicle that is to enter the traffic jam zone based on a current planned travel route of each vehicle or a current position and a travel direction of each vehicle.

When predicting a vehicle that is to enter the traffic jam zone, the prediction unit 72 notifies the extraction unit 73 of information on the vehicle together with information on the traffic jam zone. The management apparatus 100 may grasp whether there is a traffic jam and the traffic jam zone based on, for example, traffic information notified from an outside. The extraction unit 73 is configured to refer to the vehicle information database 61 and to extract information on a camera to be transmitted to each in-vehicle apparatus 1 based on position information of each camera.

When being notified of the search request from the acquisition unit 71, the extraction unit 73 extracts a camera that is present within a search range included in the search request, and transmits position information, an IP address, and the like of the extracted camera to the corresponding in-vehicle apparatus 1 via the communication unit 5.

The extraction unit 73 extracts a camera based on information on the traffic jam zone notified from the prediction unit 72. At this time, the extraction unit 73 extracts a camera that is present on the detour R2 (see FIG. 5) as described above in addition to a camera that is present in the traffic jam zone, and transmits traffic jam information including information on the extracted camera and information on the traffic jam zone to the corresponding in-vehicle apparatus 1.

The detours R2 is not necessarily one, and may be plural. After priority order has been given to a plurality of detours R2, a camera that is present on the detour R2 having a high priority may be selected.

For example, the extraction unit 73 sets, for example, the priority order based on a congestion status of each road, a travel distance to a destination, required time to the destination, and the like. Specifically, a priority of a vacant road may be set to be higher than that of a congested road, or a high priority may be set to a road having a short travel distance to the destination and a road on which short time is required for a vehicle to arrive the destination.

The extraction unit 73 may also extract the point of interest Pt based on the vehicle information transmitted from each in-vehicle apparatus 1. For example, the extraction unit 73 may extract a frequent occurrence point of sudden braking or sudden steering as the point of interest Pt, or may extract a stop spot of a plurality of vehicles as the point of interest Pt. Information on the point of interest Pt extracted by the extraction unit 73 is transmitted to each in-vehicle apparatus 1.

The extraction unit 73 may extract a past camera video from the image information database 62 and may transmit the past camera video to the in-vehicle apparatus 1 when there is no applicable vehicle at a time of extracting a camera.

Figure 11A:
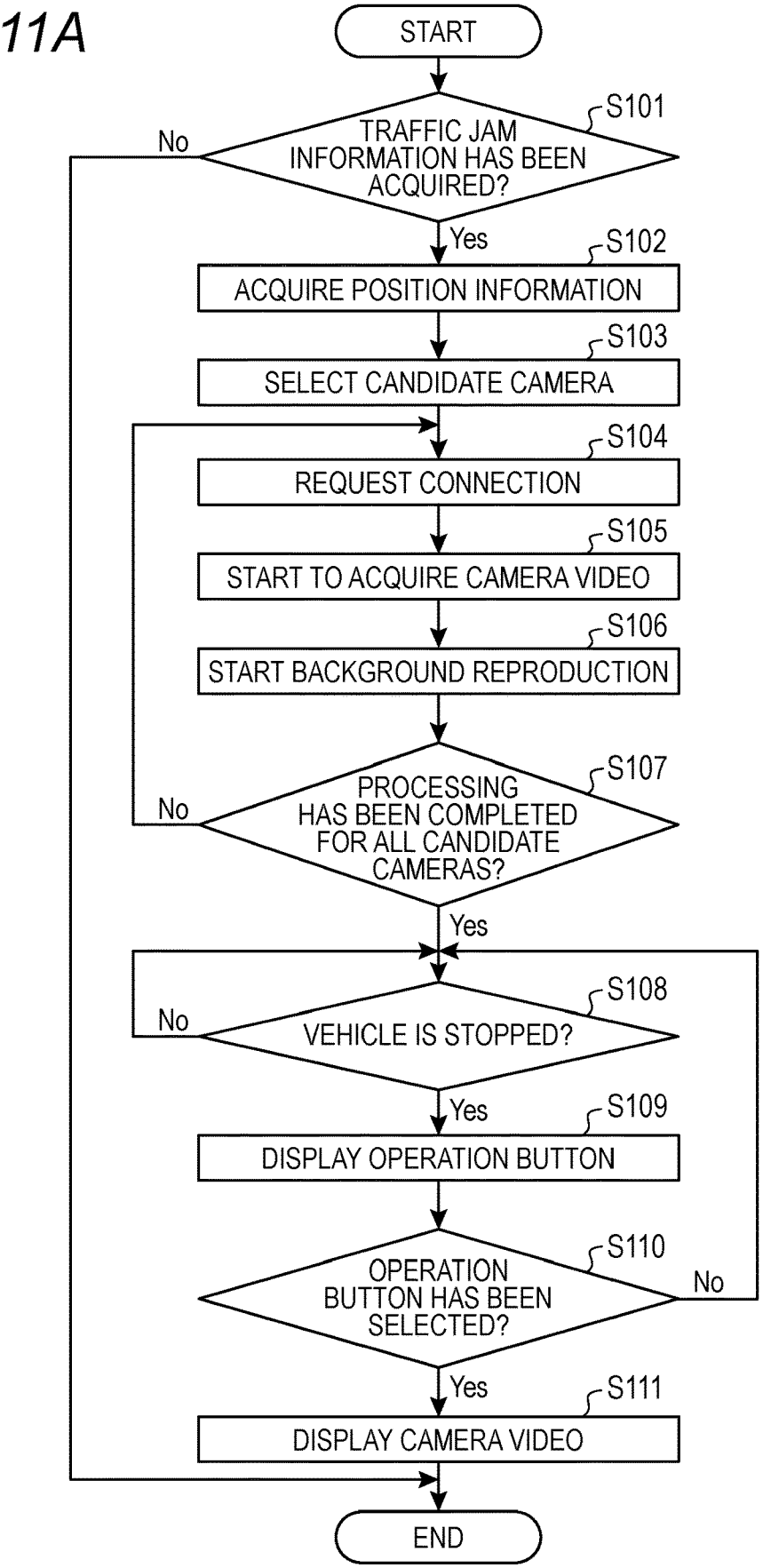
FIG. 11A is a flowchart (part 1) showing a processing procedure executed by the in-vehicle apparatus.
Figure 11B:
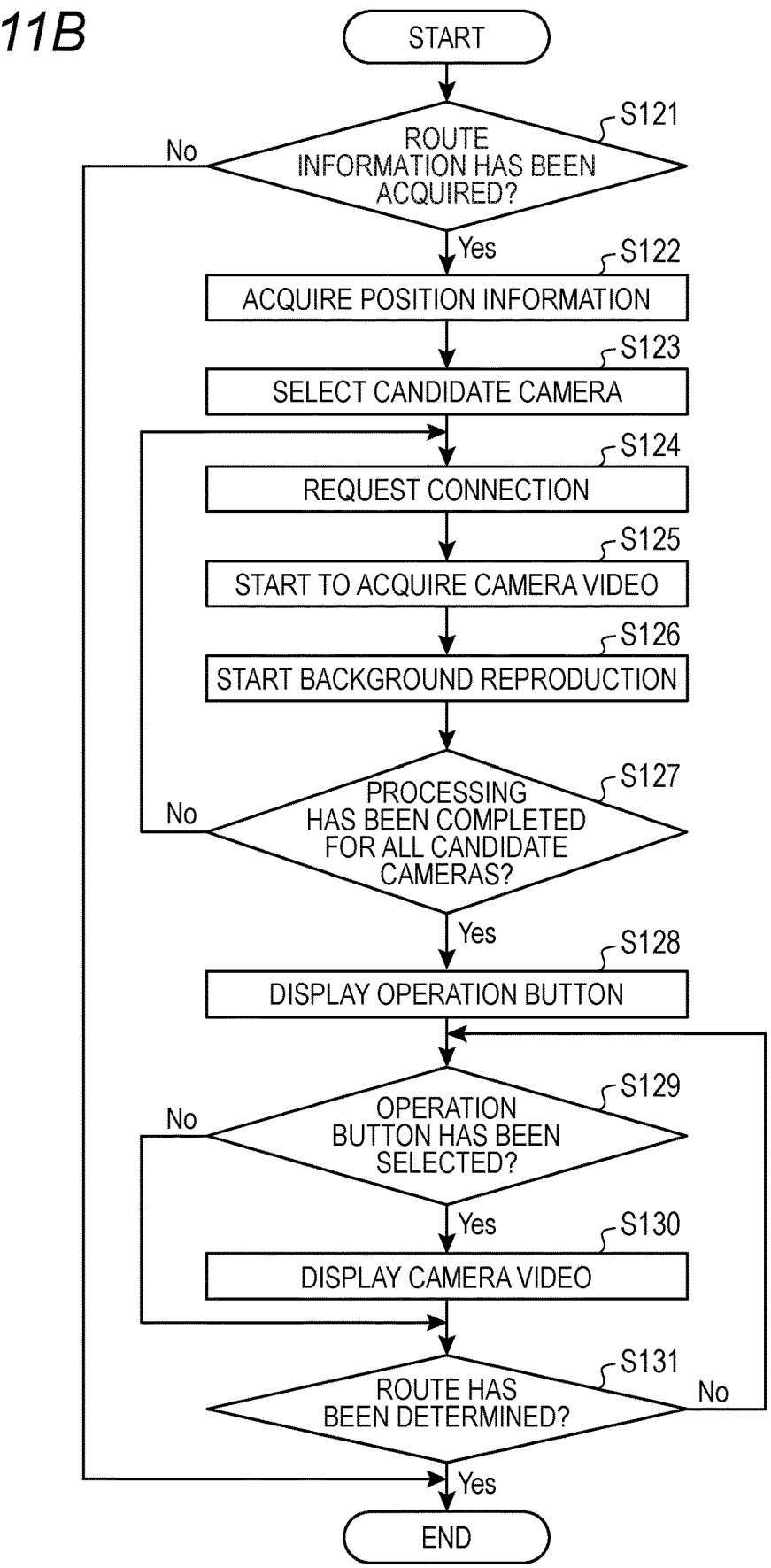
FIG. 11B is a flowchart (part 2) showing a processing procedure executed by the in-vehicle apparatus.

Next, a processing procedure executed by the in-vehicle apparatus 1 according to the embodiment will be described with reference to FIGS. 11A and 11B. FIGS. 11A and 11B are flowcharts showing the processing to be executed by the in-vehicle apparatus 1 according to the embodiment. The processing procedure described below is repeatedly executed by the control unit 4 of the in-vehicle apparatus 1.

First, a processing procedure executed by the in-vehicle apparatus 1 when a host vehicle enters a traffic jam will be described with reference to FIG. 11A. As shown in FIG. 11A, the in-vehicle apparatus 1 first determines whether traffic jam information has been acquired from the management apparatus 100 (step S101), and when the traffic jam information has been acquired (Yes in step S101), acquires position information of a camera on a traffic jam (step S102).

Subsequently, the in-vehicle apparatus 1 selects a candidate camera based on the acquired position information (step S103). At this time, the in-vehicle apparatus 1 may execute the processing in step S103 after setting the point of interest Pt.

Then, the in-vehicle apparatus 1 issues a request of connection with the candidate camera (step S104), and starts to receive a camera video from the candidate camera (step S105). Subsequently, the in-vehicle apparatus 1 starts background reproduction of the received camera video (step S106), and determines whether the processing up to step S106 has been completed for all the candidate cameras (step S107).

The in-vehicle apparatus 1 proceeds to the processing in step S104 when determining in step S107 that the processing up to step S106 is not completed for all the candidate cameras (No in step S107), and determines whether the vehicle is stopped (step S108) when determining in step S107 that the processing has been completed for all the candidate cameras (Yes in step S107).

When determining in step S108 that the vehicle is stopped (Yes in step S108), the in-vehicle apparatus 1 displays the operation button Bd (step S109), and determines whether an occupant has selected the operation button (step S110).

When determining in step S108 that the vehicle is not stopped (No in step S108) and when determining in step S110 that the operation button Bd is not selected (No in step S110), the in-vehicle apparatus 1 proceeds to the processing in step S108.

When determining in step S110 that the operation button Bd has been selected, the in-vehicle apparatus 1 displays the camera video (step S111), and ends the processing. When determining in step S101 that the traffic jam information is not acquired (No in step S101), the in-vehicle apparatus 1 ends the processing.

Next, a processing procedure of the in-vehicle apparatus 1 at a time of setting a destination in the navigation device 104 will be described with reference to FIG. 11B. As shown in FIG. 11B, first, the in-vehicle apparatus 1 determines whether route information indicating information on a destination or a candidate route has been acquired from the navigation device 104 (step S121).

When determining in step S121 that the route information has been acquired (Yes in step S121), the in-vehicle apparatus 1 acquires position information of a camera based on the route information from the management apparatus 100 (step S122).

Subsequently, the in-vehicle apparatus 1 selects a candidate camera based on the acquired position information (step S123), and issues a connection request to the candidate camera (step S124). Then, the in-vehicle apparatus 1 starts to receive a camera video from the candidate camera (step S125), and starts background reproduction of the received camera video (step S126).

Subsequently, the in-vehicle apparatus 1 determines whether the processing up to step S126 has been completed for all the candidate cameras (step S127), and displays the operation buttons Bb1 to Bb3 (step S128) when the processing up to step S126 has been completed for all the candidate cameras (Yes in step S127).

When determining in step S127 that the processing is not completed for all the candidate cameras (No in step S127), the in-vehicle apparatus 1 proceeds to the processing in step S124.

Then, the in-vehicle apparatus 1 determines whether an occupant has selected one of the operation buttons Bb1 to Bb3 (step S129), and displays the camera video (step S130) when the occupant has selected one of the operation buttons Bb1 to Bb3 (Yes in step S129).

Then, the in-vehicle apparatus 1 determines whether a route to a destination has already been determined (step S131), and ends the processing when the route has already been determined (Yes in step S131). The in-vehicle apparatus 1 proceeds to the processing in step S131 when determining in step S129 that none of the operation buttons Bb1 to Bb3 has been selected (No in step S129), and proceeds to the processing in step S129 when determining in step S131 that the route has not been determined (No in step S131).

Figure 12A:
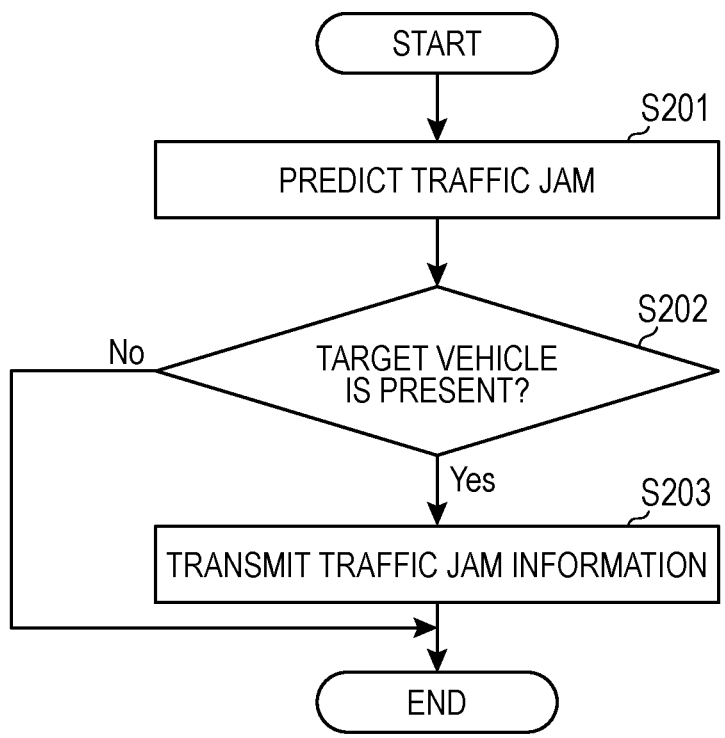
FIG. 12A is a flowchart (part 1) showing a processing procedure executed by the management apparatus.
Figure 12B:
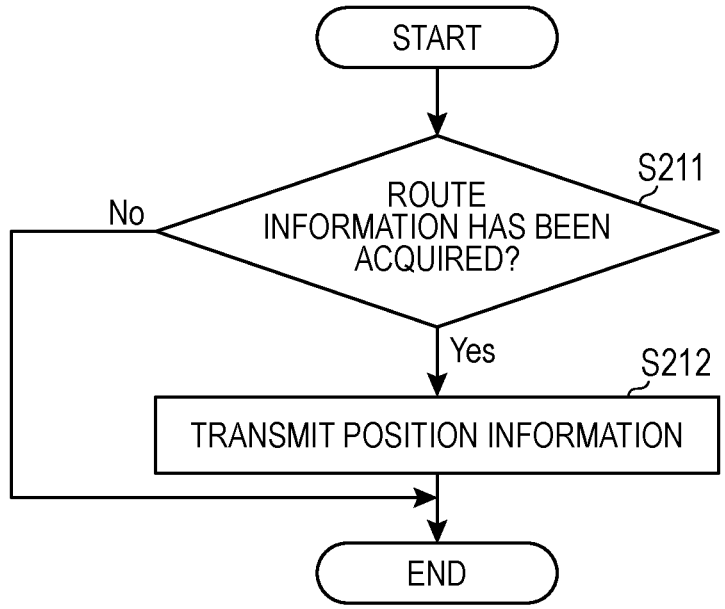
FIG. 12B is a flowchart (part 2) showing a processing procedure executed by the management apparatus.

Next, a processing procedure executed by the management apparatus 100 according to the embodiment will be described with reference to FIGS. 12A and 12B. FIGS. 12A and 12B are flowcharts showing the processing procedure executed by the management apparatus 100. The processing procedure described below is repeatedly executed by the control unit 7 of the management apparatus 100.

First, a series of processing of the management apparatus 100 accompanying traffic jam prediction will be described with reference to FIG. 12A. As shown in FIG. 12A, based on the vehicle information transmitted from each in-vehicle apparatus 1, the management apparatus 100 executes the traffic jam prediction regarding whether there is a traffic jam, a traffic jam zone, and the like (step S201).

Subsequently, the management apparatus 100 determines whether a target vehicle that is to enter the traffic jam zone is present based on a result of the traffic jam prediction (step S202), and transmits traffic jam information to the in-vehicle apparatus 1 of the target vehicle (step S203) and ends the processing when the target vehicle is present (Yes in step S202).

When determining in step S202 that no target vehicle is present (No in step S202), the management apparatus 100 ends the processing without passing through processing in step S203.

Next, a processing procedure of the management apparatus 100 at the time of setting a destination in the navigation device 104 will be described with reference to FIG. 12B. As shown in FIG. 12B, the management apparatus 100 determines whether route information has been acquired from the in-vehicle apparatus 1 (step S211), and transmits position information of a camera corresponding to the route information to the in-vehicle apparatus 1 (step S212) and ends the processing when the route information has been acquired (Yes in step S211).

When determining in step S211 that the route information has not been acquired (No in step S211), the management apparatus 100 omits the processing in step S212 and ends the processing.

As described above, the in-vehicle apparatus 1 according to the embodiment includes the selection unit, the reception unit, and the display control unit. The selection unit is configured to select a candidate camera from a plurality of cameras based on position information of the plurality of cameras. The reception unit is configured to establish communication connection with a candidate camera selected by the selection unit, and to start to receive a camera video captured by the candidate camera. The display control unit is configured to display a camera video received by the reception unit when a predetermined display condition is satisfied.

The in-vehicle apparatus 1 may also generate a composite video from camera videos received from a plurality of the in-vehicle apparatus 1, for example.

Figure 13:
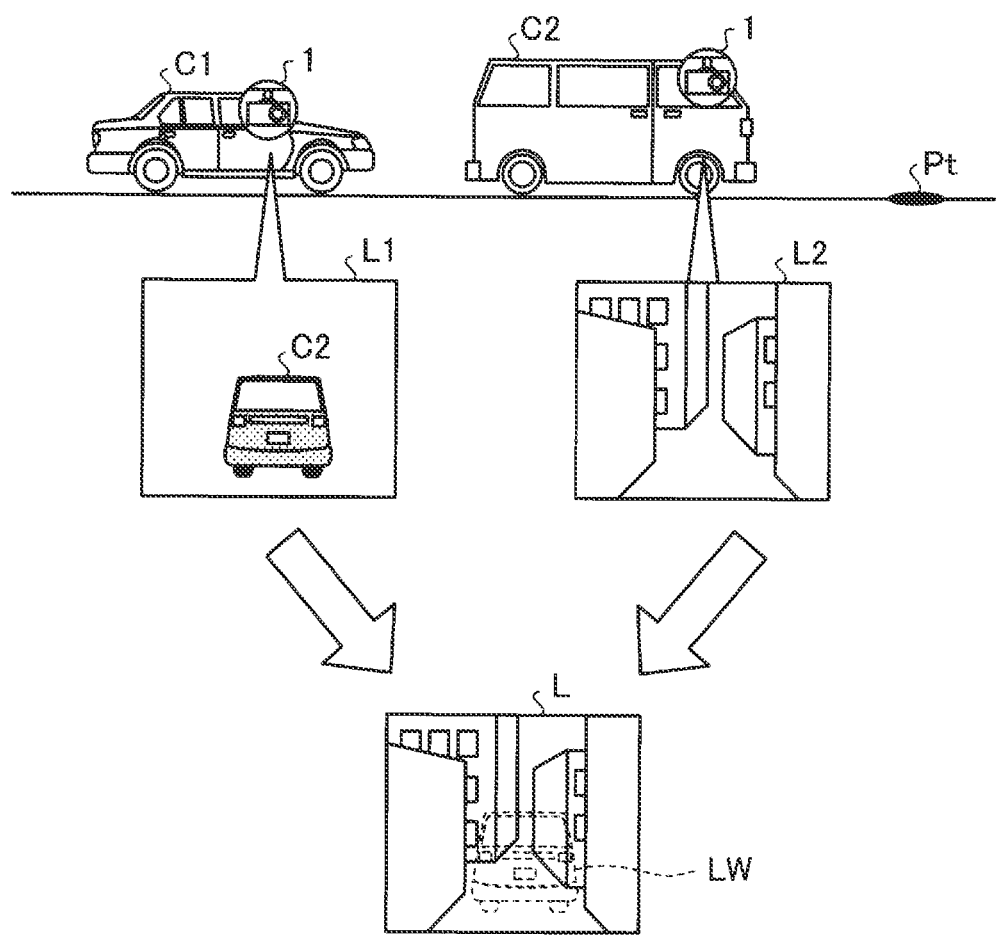
FIG. 13 shows an example of a composite image.

FIG. 13 shows a specific example of an image quality image. Here, a case will be described in which a composite image L is generated based on a camera video L1 received from the in-vehicle apparatus 1 of a vehicle C1 and a camera video L2 received from the in-vehicle apparatus 1 of a vehicle C2. The vehicle C2 is in front of the vehicle C1.

As shown in FIG. 13, for example, the in-vehicle apparatus 1 generates a watermark image LW of the vehicle C2 shown in the camera video L1 of the vehicle C1. For example, the in-vehicle apparatus 1 generates the watermark image LW of the vehicle C2 by executing predetermined image processing on the camera video L1.

Here, the watermark image LW is a frame image showing a skeleton of the vehicle C2, a translucent image (for example, a polygon image) in which the vehicle C2 is transparent, or the like. Then, the in-vehicle apparatus 1 generates the composite image L by superimposing the watermark image LW on the camera video L2 received from the vehicle C2.

The composite image L displays the point of interest Pt that is virtually visible from the vehicle C1, and also notifies that the vehicle C2 is present. The composite image L is generated and displayed, so that it is possible to provide various contents.

In the above-described embodiment, a case has been described in which a camera video is transmitted and received between the in-vehicle apparatuses 1 mounted on vehicles. However, the present invention is not limited thereto. That is, the in-vehicle apparatuses 1 may transmit and receive a camera video via the management apparatus 100.

Communication between the in-vehicle apparatuses 1 may be appropriately changed according to a distance between the vehicles, for example, using short range wireless communication which is Wi-Fi (registered trademark) or the like. Further, in order to reduce delay time for transmission of a camera video, communication of both Wi-Fi and a mobile phone network may be used, and a camera video and vehicle information and position information associated with the camera video may be transmitted to the in-vehicle apparatus 1 or the management apparatus 100 that is a distribution destination using so-called link aggregation.

In the above-described embodiment, a case has been described in which a camera video is received after communication has been established. However, the communication may be established or a communication state may be maintained by transmitting and receiving dummy data or the like.

In the distribution system S according to the embodiment, a part or all of functions of the management apparatus 100 may be implemented by each in-vehicle apparatus 1, or a part or all of functions of each in-vehicle apparatus 1 may be implemented by the management apparatus 100.

In the above-described embodiment, a case has been described in which predetermined user operation is performed as a display condition. However, the present invention is not limited thereto. The display condition may be set such that display is automatically started based on a position and a speed of a vehicle. For example, when predetermined time elapses after the first trigger that a vehicle has entered a traffic jam zone, the display condition is satisfied, and the display may be automatically started. After the vehicle has entered the traffic jam zone, the display condition may be satisfied and the display may be automatically started when a vehicle speed is reduced and the vehicle is in a low-speed travel state.

Additional effects and modifications may be easily derived by those skilled in the art. Therefore, broader aspects of the present invention are not limited to the specific details and the representative embodiment that are shown and described above. Accordingly, various modifications may be attained without departing from the spirit or the scope of the general inventive concept as defined by the appended claims and equivalents thereof.

What is claimed is:

1. An in-vehicle apparatus that is mounted in a host vehicle, the in-vehicle apparatus comprising a hardware processor configured to:
   select, in response to a trigger being detected, at least one candidate camera from a plurality of cameras, the at least one candidate camera corresponding to a scene which is predicted in relation to the trigger and of which a video is desired, the at least one candidate camera being selected based on position information of each of the plurality of cameras;
   establish communication connection with the at least one candidate camera that has been selected;
   start processing that receives video captured by the at least one candidate camera; and
   display the video that is received as a result of the processing in response to a predetermined display condition being satisfied, the predetermined display condition being satisfied: (i) after the trigger is detected, (ii) after the communication connection has been established, and (iii) after the start of the processing.

2. The in-vehicle apparatus according to claim 1, wherein the plurality of cameras includes at least one of (a) an on-vehicle camera that is mounted on another vehicle that is different from the host vehicle in which the in-vehicle apparatus is mounted and (b) a fixed-point camera.

3. The in-vehicle apparatus according to claim 1, wherein the trigger is detected when a destination is set for the host vehicle, and the at least one candidate camera is selected that is on at least one candidate route to the destination.

4. The in-vehicle apparatus according to claim 3, wherein in a case where the at least one candidate route includes a plurality of candidate routes, the hardware processor selects cameras on each of the plurality of candidate routes so that there are a plurality of the candidate cameras, and
   the hardware processor displays the video for each of the plurality of candidate routes.

5. The in-vehicle apparatus according to claim 1, wherein the trigger is detected when the hardware processor predicts that the host vehicle in which the in-vehicle apparatus is mounted is to enter into a traffic jam zone.

6. The in-vehicle apparatus according to claim 5, wherein the hardware processor selects at least one of a camera that is present in the traffic jam zone and a camera that is present beyond the traffic jam zone as the at least one candidate camera.

7. The in-vehicle apparatus according to claim 5, wherein the hardware processor selects a camera that is present on a detour for the traffic jam zone as the at least one candidate camera.

8. The in-vehicle apparatus according to claim 1, wherein the hardware processor selects a camera that captures video of a point of interest set based on the predetermined display condition as the candidate camera.

9. The in-vehicle apparatus according to claim 8, wherein the hardware processor displays the video of the point of interest that is captured when the predetermined display condition is satisfied.

10. The in-vehicle apparatus according to claim 8, wherein
the hardware processor selects the candidate camera based on the point of interest, the point of interest being further set based on travel information of another vehicle that is different from the host vehicle in which the in-vehicle apparatus is mounted.

11. The in-vehicle apparatus according to claim 1, wherein
the at least one candidate camera includes a plurality of candidate cameras, and
the hardware processor displays a list of plural pieces of video received from the plurality of candidate cameras.

12. The in-vehicle apparatus according to claim 1, wherein
the at least one candidate camera includes a plurality of candidate cameras, and
the hardware processor displays the video received from the plurality of candidate cameras in a switching manner at a predetermined interval.

13. The in-vehicle apparatus according to claim 1, wherein
the predetermined display condition that is satisfied is a user-operation of a button that is displayed on a display of the host vehicle, and
the hardware processor displays the button on the display of the host vehicle (i) after the trigger is detected, (ii) after the communication connection has been established, and (iii) after the start of the processing.

14. The in-vehicle apparatus according to claim 1, wherein
the trigger is detected when the host vehicle has entered a predetermined zone, and
the predetermined display condition is satisfied a predetermined time period after the trigger has been detected.

15. A distribution system comprising:
an in-vehicle apparatus that is mounted in a host vehicle, the in-vehicle apparatus comprising a hardware processor configured to:
select, in response to a trigger being detected, at least one candidate camera from a plurality of cameras, the at least one candidate camera corresponding to a scene which is predicted in relation to the trigger and of which a video is desired, the at least one candidate camera being selected based on position information of each of the plurality of cameras;
establish communication connection with the at least one candidate camera that has been selected;
start processing that receives video captured by the at least one candidate camera; and
display the video that is received as a result of the processing in response to a predetermined display condition being satisfied, the predetermined display condition being satisfied: (i) after the trigger is detected, (ii) after the communication connection has been established, and (iii) after the start of the processing;
a management apparatus configured to collect position information of the at least one candidate camera and to provide the position information of the at least one candidate camera to the in-vehicle apparatus; and
the plurality of cameras.

16. A video receiving method that is executed by a hardware processor of an in-vehicle apparatus that is mounted in a host vehicle, the method comprising:
selecting, in response to a trigger being detected, at least one candidate camera from a plurality of cameras, the at least one candidate camera corresponding to a scene which is predicted in relation to the trigger and of which a video is desired, the at least one candidate camera being selected based on position information of each of the plurality of cameras;
establishing communication connection with the at least one candidate camera that has been selected, starting processing that receives video captured by the at least one candidate camera; and
controlling a display of the host vehicle such that the video that is received as a result of the processing is displayed in response to a predetermined display condition being satisfied, the predetermined display condition being satisfied: (i) after the trigger is detected, (ii) after the communication connection has been established, and (iii) after the start of the processing.

* * * * *